(12) United States Patent
Jury et al.

(10) Patent No.: US 10,255,931 B1
(45) Date of Patent: *Apr. 9, 2019

(54) MISO EQUALIZATION WITH ADC AVERAGING

(71) Applicant: Seagate Technology LLC, Cupertino, CA (US)

(72) Inventors: Jason Charles Jury, Minneapolis, MN (US); Marcus Marrow, San Jose, CA (US); Michael J Link, St Paul, MN (US); Jason Bellorado, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,480

(22) Filed: Mar. 5, 2018

Related U.S. Application Data

(63) Continuation of application No. 15/586,217, filed on May 3, 2017, now Pat. No. 9,928,854.

(51) Int. Cl.

| G11B 20/10 | (2006.01) |
|---|---|
| G11B 5/035 | (2006.01) |
| G11B 5/012 | (2006.01) |
| G11B 21/10 | (2006.01) |
| G06F 11/07 | (2006.01) |
| G11B 5/00 | (2006.01) |

(52) U.S. Cl.
CPC .......... *G11B 5/012* (2013.01); *G06F 11/0793* (2013.01); *G11B 5/035* (2013.01); *G11B 21/106* (2013.01); *G11B 2005/0013* (2013.01)

(58) Field of Classification Search
CPC ........... G11B 5/012; G11B 27/36; G11B 5/02; G11B 20/10527; G11B 2220/90; G11B 5/09; G11B 5/035; G11B 1005/0016; G11B 2005/0013; G11B 21/106; G06F 11/0793
USPC ............................ 360/25, 32, 39, 46, 65, 67
See application file for complete search history.

(56) References Cited

U.S. PATENT DOCUMENTS

| 5,563,746 | A | 10/1996 | Bliss |
|---|---|---|---|
| 5,726,818 | A | 3/1998 | Reed et al. |
| 5,754,352 | A | 5/1998 | Behrens et al. |
| 5,793,548 | A | 8/1998 | Zook |
| 5,822,142 | A | 10/1998 | Hicken |
| 5,909,332 | A | 6/1999 | Spurbeck et al. |
| 5,954,837 | A | 9/1999 | Kim |
| 6,069,758 | A | 5/2000 | Chung |
| 6,172,836 | B1 | 1/2001 | Bang |
| 6,275,346 | B1 | 8/2001 | Kim et al. |
| 6,307,696 | B1 | 10/2001 | Bishop et al. |
| 6,330,293 | B1 | 12/2001 | Klank et al. |
| 6,353,649 | B1 | 3/2002 | Bockleman et al. |
| 6,480,349 | B1 | 11/2002 | Kim et al. |
| 6,594,094 | B2 | 7/2003 | Rae |
| 6,594,098 | B1 | 7/2003 | Sutardja |

(Continued)

*Primary Examiner* — Nabil Z Hindi
(74) *Attorney, Agent, or Firm* — Cesari & Reed, LLP; Kirk A. Cesari

(57) ABSTRACT

An apparatus may include a circuit configured to generate a set of first ADC samples based on a first signal associated with a first read head position and a failed segment and to generate a set of second ADC samples based on a second signal associated with a second read head position and the failed segment. The circuit may then generate, by a MISO equalizer, a set of equalized ADC samples based on the set of first ADC samples and the set of second ADC samples.

20 Claims, 10 Drawing Sheets

(56) References Cited

U.S. PATENT DOCUMENTS

| | | |
|---|---|---|
| 6,760,185 B1 | 7/2004 | Roth et al. |
| 6,973,150 B1 | 12/2005 | Thuringer |
| 6,996,193 B2 | 2/2006 | Yamagata et al. |
| 7,035,029 B2 | 4/2006 | Sawada et al. |
| 7,068,461 B1 | 6/2006 | Chue et al. |
| 7,075,967 B2 | 7/2006 | Struhsaker et al. |
| 7,199,956 B1 | 4/2007 | Moser et al. |
| 7,297,582 B2 | 11/2007 | Asakura et al. |
| 7,602,568 B1 | 10/2009 | Katchmart |
| 7,643,548 B2 | 1/2010 | Hafeez |
| 7,665,007 B2 | 2/2010 | Yang et al. |
| 7,738,538 B1 | 6/2010 | Tung |
| 7,917,563 B1 | 3/2011 | Shih et al. |
| 7,995,691 B2 | 8/2011 | Yang |
| 8,019,026 B2 | 9/2011 | Maltsev et al. |
| 8,077,571 B1 | 12/2011 | Xia et al. |
| 8,121,229 B2 | 2/2012 | Kuo et al. |
| 8,159,768 B1 | 4/2012 | Miyamura |
| 8,266,505 B2 | 9/2012 | Liu et al. |
| 8,331,050 B1 | 12/2012 | Zou |
| 8,400,726 B1 | 3/2013 | Zheng |
| 8,405,924 B2 | 3/2013 | Annampedu |
| 8,516,347 B1 | 8/2013 | Li et al. |
| 8,553,730 B2 | 10/2013 | Schmidl et al. |
| 8,593,750 B2 | 11/2013 | Shibano |
| 8,625,216 B2 | 1/2014 | Zhang et al. |
| 8,681,444 B2 | 3/2014 | Zhang |
| 8,706,051 B2 | 4/2014 | Park et al. |
| 8,774,318 B2 | 7/2014 | Lakkis |
| 9,043,688 B1 | 5/2015 | Chan et al. |
| 9,077,501 B1 | 7/2015 | Oberg et al. |
| 9,078,204 B2 | 7/2015 | Okazaki |
| 9,178,625 B1 | 11/2015 | Hueda et al. |
| 9,236,952 B2 | 1/2016 | Sun |
| 9,362,933 B1 | 6/2016 | Chaichanavong |
| 9,425,950 B2 | 8/2016 | Kou |
| 9,537,589 B2 | 1/2017 | Kim et al. |
| 9,613,652 B2 | 4/2017 | Link et al. |
| 2002/0094048 A1 | 7/2002 | Simmons et al. |
| 2003/0026016 A1 | 2/2003 | Heydari et al. |
| 2003/0048562 A1 | 3/2003 | Heydari et al. |
| 2003/0185291 A1 | 10/2003 | Nakahira et al. |
| 2004/0047403 A1 | 3/2004 | Choi et al. |
| 2007/0002890 A1 | 1/2007 | Mangold et al. |
| 2007/0018733 A1 | 1/2007 | Wang |
| 2007/0205833 A1 | 9/2007 | Mar et al. |
| 2008/0292029 A1 | 11/2008 | Koslov |
| 2009/0268857 A1 | 10/2009 | Chen |
| 2010/0138722 A1 | 6/2010 | Harley |
| 2010/0211830 A1 | 8/2010 | Sankaranarayanan et al. |
| 2010/0272150 A1 | 10/2010 | Kil et al. |
| 2011/0072330 A1 | 3/2011 | Kolze |
| 2011/0158359 A1 | 6/2011 | Khayrallah et al. |
| 2013/0182347 A1 | 7/2013 | Maeto |
| 2013/0339827 A1 | 12/2013 | Han et al. |
| 2014/0337676 A1 | 11/2014 | Yen et al. |
| 2014/0355147 A1 | 12/2014 | Cideciyan et al. |
| 2015/0124912 A1 | 5/2015 | Eliaz et al. |
| 2015/0179213 A1 | 6/2015 | Liao et al. |
| 2015/0189574 A1 | 7/2015 | Ng et al. |
| 2016/0055882 A1 | 2/2016 | Cideciyan et al. |
| 2016/0134449 A1 | 5/2016 | Liu et al. |
| 2016/0156493 A1 | 6/2016 | Bae et al. |
| 2016/0270058 A1 | 9/2016 | Furuskog et al. |
| 2016/0293205 A1 | 10/2016 | Jury et al. |
| 2017/0162224 A1 | 6/2017 | Mathew et al. |

MISO EQUALIZATION WITH ADC AVERAGING

CROSS-REFERENCE TO RELATED APPLICATIONS

This application is a continuation of and claims priority to co-pending U.S. patent application Ser. No. 15/586,217, entitled "MISO EQUALIZATION WITH ADC AVERAGING", which was filed May 3, 2017, the contents of which is incorporated herein by reference in its entirety.

SUMMARY

In certain embodiments, an apparatus may include a circuit configured to generate a set of first ADC samples based on a first signal associated with a first read head position and a failed segment and to generate a set of second ADC samples based on a second signal associated with a second read head position and the failed segment. The circuit may then generate, by a MISO equalizer, a set of equalized ADC samples based on the set of first ADC samples and the set of second ADC samples.

In certain embodiments, a system may comprise one or more ADC circuits configured to generate a plurality of sets of first ADC samples based on a first signal associated with a first read head position and a failed segment and generate a plurality of sets of second ADC samples based on a second signal associated with a second read head position and the failed segment. The system may further include one or more accumulator circuits configured to generate averaged first ADC samples based on the plurality of sets of first ADC samples and generate averaged second ADC samples based on the plurality of sets of second ADC samples. In addition, the system may include a MISO equalizer configured to generate one or more equalized ADC samples based on the averaged first ADC samples and the averaged second ADC samples.

In certain embodiments, a system may include one or more ADC circuits configured to generate a set of first ADC samples based on a first signal associated with a first read head position and a failed segment and generate a set of second ADC samples based on a second signal associated with a second read head position and the failed segment. The system may also include a MISO equalizer configured to generate a set of equalized ADC samples based on the set of first ADC samples and the set of second ADC samples.

DETAILED DESCRIPTION

Figure 1A:
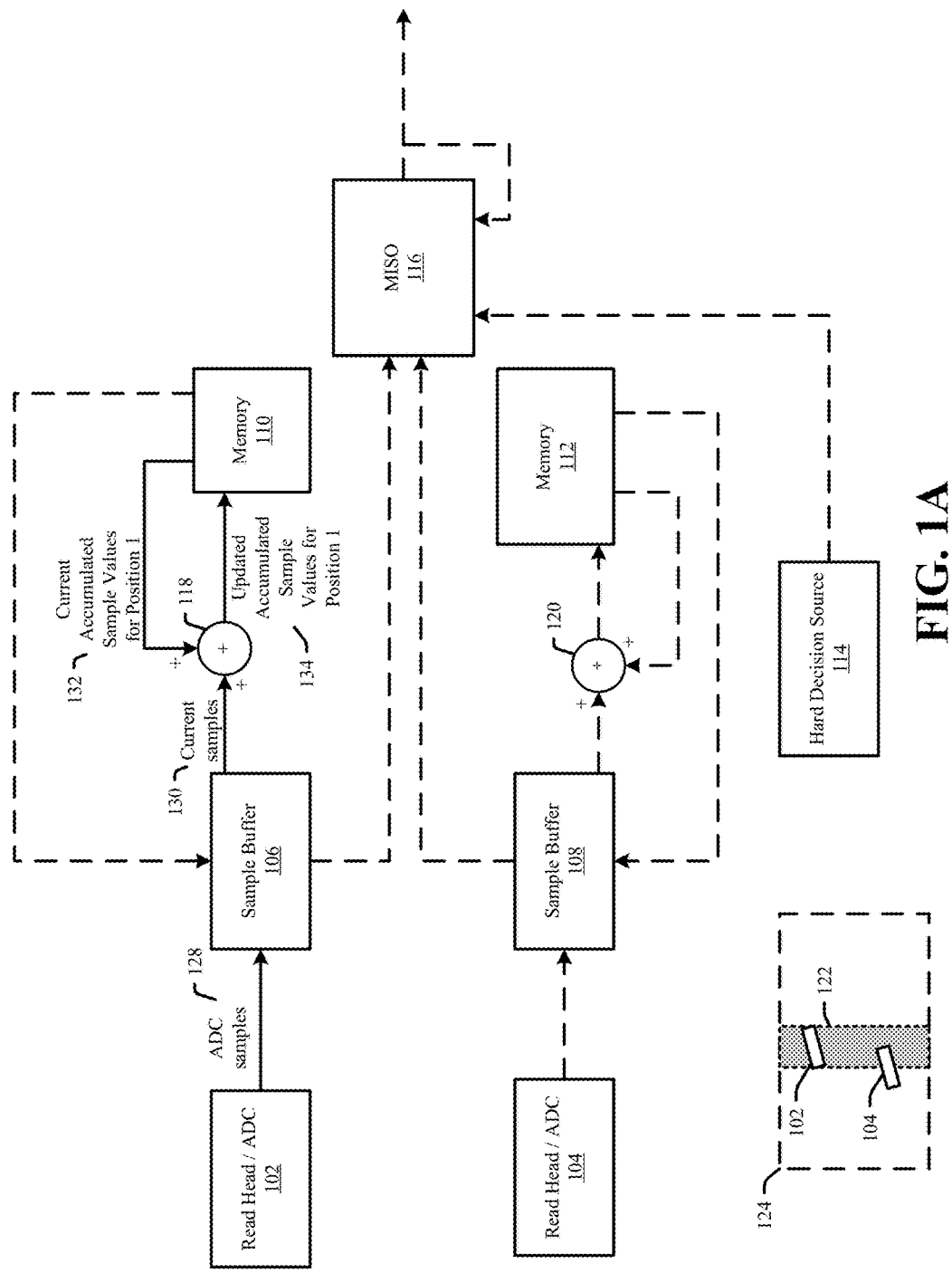
FIGS. 1A-1E are block diagrams of a system of error recovery based on samples generated by combining data samples from multiple head positions using a multi-input single-output (MISO) equalizer, in accordance with certain embodiments of the present disclosure.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with another embodiment, the methods and functions described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or device including instructions that when executed cause a processor to perform the methods.

The present disclosure generally relates to error recovery, and in some embodiments, the present disclosure may relate to error recovery based on samples generated by combining data samples from multiple head positions using one or more multi-input single-output (MISO) equalizers. Some systems, such as electrical, electronic, motor drive, processing, or other systems may receive a signal of interest and process that signal based on parameters.

Embodiments of the disclosed subject matter may provide a method and apparatus for recovering data on a storage medium. A read channel of, for example, a communication system or a magnetic recording storage system, may receive an analog input signal and generate a data sequence based thereon. When data is requested by a host from a storage device such as a hard drive, the requested data (e.g., incoming or read data) may be checked to ensure that it is error free. Requested data that contains errors (in other words, the requested data may not be error free) may result in what may be referred to as a data failure (e.g., a segment/sector failure, a unit/track failure, etc.). Error recovery may involve one or more of re-readings of the segment(s) to be recovered and the generation of samples for these segments to be used in the recovery process.

In some embodiments herein, improved samples may be generated using, for example, using a multi-input single-output (MISO) equalizer. The improved samples may be used as input to a decoder. Various embodiments of the disclosed subject matter may be used with single, dual or more than two read head systems.

In some examples, a MISO equalization process may be utilized to generate improved samples for error recovery. During error recovery, the MISO equalization process may re-read failed segments at different read positions and accumulate the ADC samples in a respective buffer location for the each read position.

For example, in some embodiments which include a single read head, two or more different read positions may be utilized and samples for each read position may be accumulated in respective buffers. In operation, the MISO equalization process may re-read multiple times at a current read position, accumulate samples from each re-read in the respective buffer, move the read head to the next read position and repeat the process. This process may also be performed with multiple read heads, such as by re-reading with one of the multiple read heads per read position.

Similarly, in embodiments with multiple read heads in a read head array, the MISO equalization process may re-read multiple times at a current read position (e.g. multiple times with each of one or more of the heads), accumulate samples from each re-read in the respective buffer or buffers (e.g. each head may re-read one or more times at each positioning of the read head array), move the read head array to the next read position and repeat the process.

The accumulated (e.g. combined or averaged) data in the buffers may be passed into a MISO equalizer. The MISO equalizer may be trained in various ways depending on specific usage case, but a target signal may be used and may be based on some set of hard decisions for the failed segment in error recovery. In some examples, preliminary hard decisions may be gathered either from earlier error recovery steps or hard decisions may be generated by a detector at the time the ADC samples are captured. In some examples, the improved samples generated by the MISO equalizer may be output to a detector. The detector may utilize the MISO equalizer (e.g. the equalized samples) to generate the hard decisions. In turn, these hard decisions may be used to retrain the detector or re-train the MISO equalizer.

In some multi-read head embodiments, a MISO equalizer may be utilized with recursive combining to generate the equalized samples for error recovery. During error recovery, the system may re-read failing segments concurrently at the multiple read heads and at different read positions. The system may recursively combine the samples acquired by the multiple read heads with the previous MISO output (e.g. the equalized samples) with the current ADC samples. For example, at each re-read, the MISO equalizer output may be stored. A decoder (e.g. an iterative decoder) may process the data (e.g. the equalized samples) output by the MISO equalizer to attempt recovery of the failed segment. If the data of the segment has not been recovered, the recursive combining by the MISO equalizer may continue and the MISO equalizer may combine subsequently generated ADC sample data with the previous output of the MISO equalizer. Depending on the embodiment, the combining performed by the MISO may be a simple average, a weighted average or a spectrally weighted filtering process.

In some embodiments, the read heads may be widely separated with regard to a track being read when at high skew, or due to servo arm or read head manufacturing. The read head array on the servo arm may be positioned at the first read offset (e.g. offset from a center of the of the track) or position for N/R reads and then re-positioned at the other read offset or positions for N/R reads for each additional read head. For the samples generated at each read, the previous MISO output may be combined with the current samples. The MISO equalizer may be adapted on each read of the segment and the output may be sent to the decoder for error recovery processing. This may continue until the decoder is successful or the N reads are completed.

Examples of such systems are discussed below with regard to FIGS. 1-5.

Referring to FIGS. 1A-1E, a block diagram of a system of error recovery is shown and is generally designated 100. More particularly, system 100 may perform error recovery based on samples generated by combining data samples from multiple head positions using a multi-input single-output (MISO) equalizer. FIGS. 1A to 1E illustrate the system 100 during example phases of operation.

System 100 can include a read head and analog-to-digital converter (ADC) subsystem 102 (also referred to herein as read head 1) that may be coupled to a sample buffer 106 and an ADC subsystem 104 (also referred to herein as read head 2) that may be coupled to a sample buffer 108. In some examples, the read heads of subsystems 1 and 2 may be affixed to a servo arm in an arrangement referred to herein as a read head array. The sample buffers 106 and 108 may be coupled to the adders 118-120, respectively, and to the MISO equalizer 116. The adders 118 and 120 may be coupled to the memory 110 and memory 112, respectively. The memories 110 and 112 may be coupled to the sample buffers 106 and 108. In some implementations, the memories 110 and 112 may be a DRAM or similar memory storage device. In addition, the MISO equalizer 116 may be coupled to a hard decision source 114.

Each of the read heads 102 and 104, the samples buffers 106-108, the adders 118-120, memory locations 110 and 112, the hard decision source 114 and MISO equalizer 116 may be a separate circuit, a system on chip (SOC), firmware, a processor(s), or other system not listed, or any combination thereof.

In the following discussion, for readability, sets of ADC samples corresponding to, for example, a failed segment or data unit, are discussed as ADC samples. Implementations are not so limited. For example, various implementations may operate on single samples, samples corresponding to portions of a segment, or samples corresponding to multiple segments (e.g. some or all of the segments of a failed data unit).

During the phase of operation illustrated in FIG. 1A, a read head array including read heads 102 and 104 may be positioned relative to a track 122 (e.g. a track of a magnetic recording medium) as shown at 124, (e.g. such that the read head 102 is in a first read head position). The read head and ADC subsystem 102 may generate ADC samples 128 for the current read (e.g. samples for one or more failed segments). For example, read head 102 may generate an analog signal based on fluctuations in a magnetic field corresponding to the surface of a magnetic storage medium. An ADC of subsystem 102 may convert the analog signal generated by the read head into the digital ADC samples 128. The ADC samples 128 may be output to the sample buffer 106.

The sample buffer 106 may receive and store the ADC samples 128 received from the read head 102. The sample buffer 106 may output the ADC samples of, for example, a re-read, to the adder 118 as the current samples 130. Similarly, the memory 110 may output the current accumulated sample values 132 to the adder 118. The adder 118 may generate the updated accumulated sample values 134 by summing the current samples 130 and the current accumulated sample values 132. The updated accumulated sample values 134 may be output to the memory 110. In turn, the memory 110 may receive and store the updated accumulated sample values 134.

The operations illustrated in FIG. 1A may be performed N/R times, where N is a total number of iterations and R is the number of read positions (e.g. R is two in the illustrated example). Subsequently, the system 100 may progress to the next phase of operations illustrated in FIG. 1B.

Figure 1B:
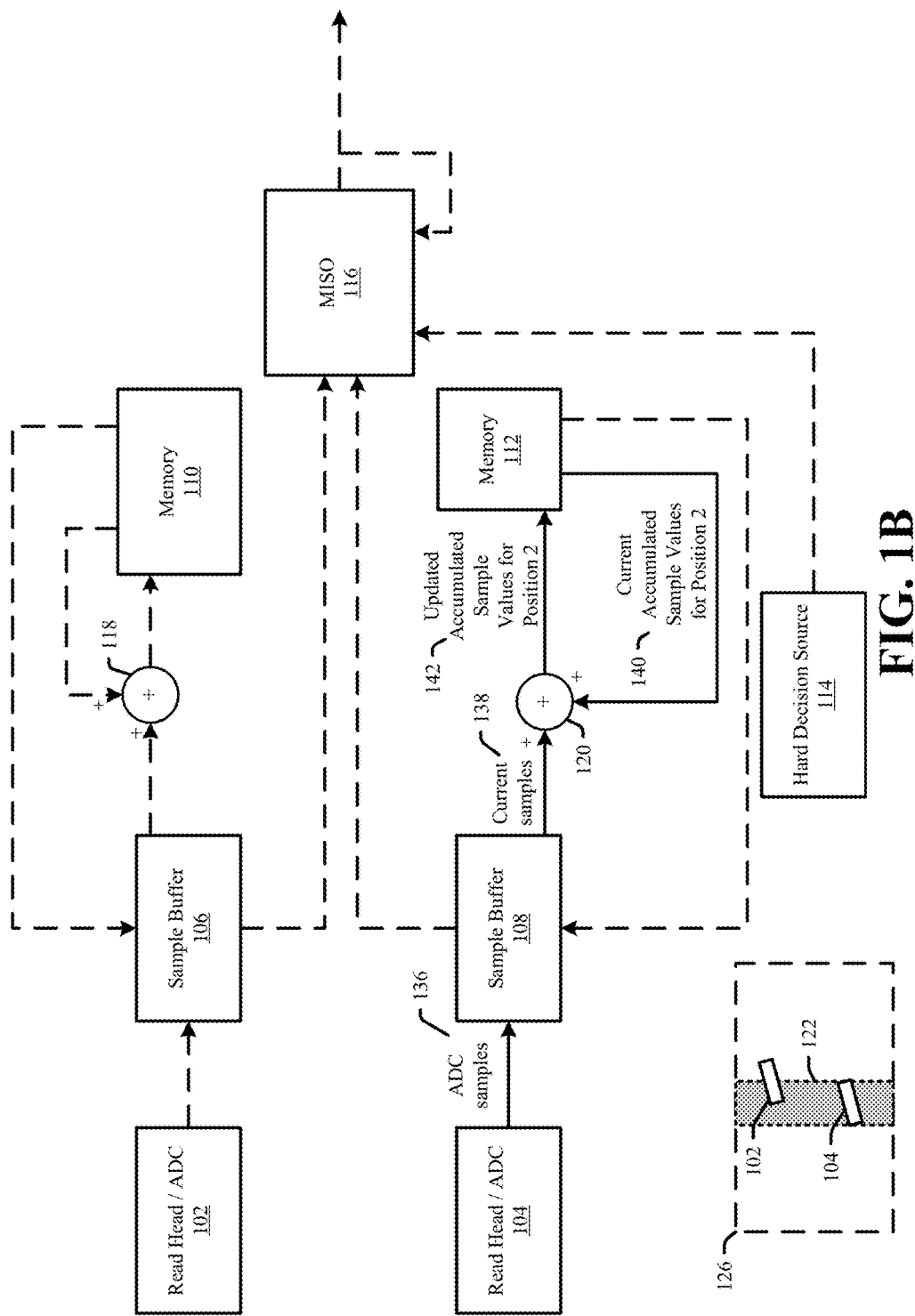

During the phase of operation illustrated in FIG. 1B, the read head array including read heads 102 and 104 may be positioned relative to the track 122 as shown at 126 (e.g. such that the read head 104 is in a second read head position). The read head and ADC subsystem 104 may generate ADC samples 136 for the current read (e.g. samples for one or more failed segments). An ADC of subsystem 104 may convert the analog signal from the read head into the digital ADC samples 136. The ADC samples 136 may be output to the sample buffer 108.

The sample buffer 108 may receive and store the ADC samples 136 received from the read head 104. The sample buffer 108 may output the ADC samples of, for example, a re-read, to the adder 120 as the current samples 138. The memory 112 may output current accumulated sample values 140 to the adder 120. The adder 120 may generate updated accumulated sample values 142 by summing the current sample 138 and the current accumulated sample values 140. The updated accumulated sample values 134 may be output to the memory 112. In turn, the memory 112 may receive and store the updated accumulated sample values 142.

The operations illustrated in FIG. 1B may be performed N/R times, where N is a total number of iterations and R is the number of read positions (e.g. R is two in the illustrated example). Subsequently, the system 100 may progress to the next phase of operations illustrated in FIG. 1C.

Figure 1C:
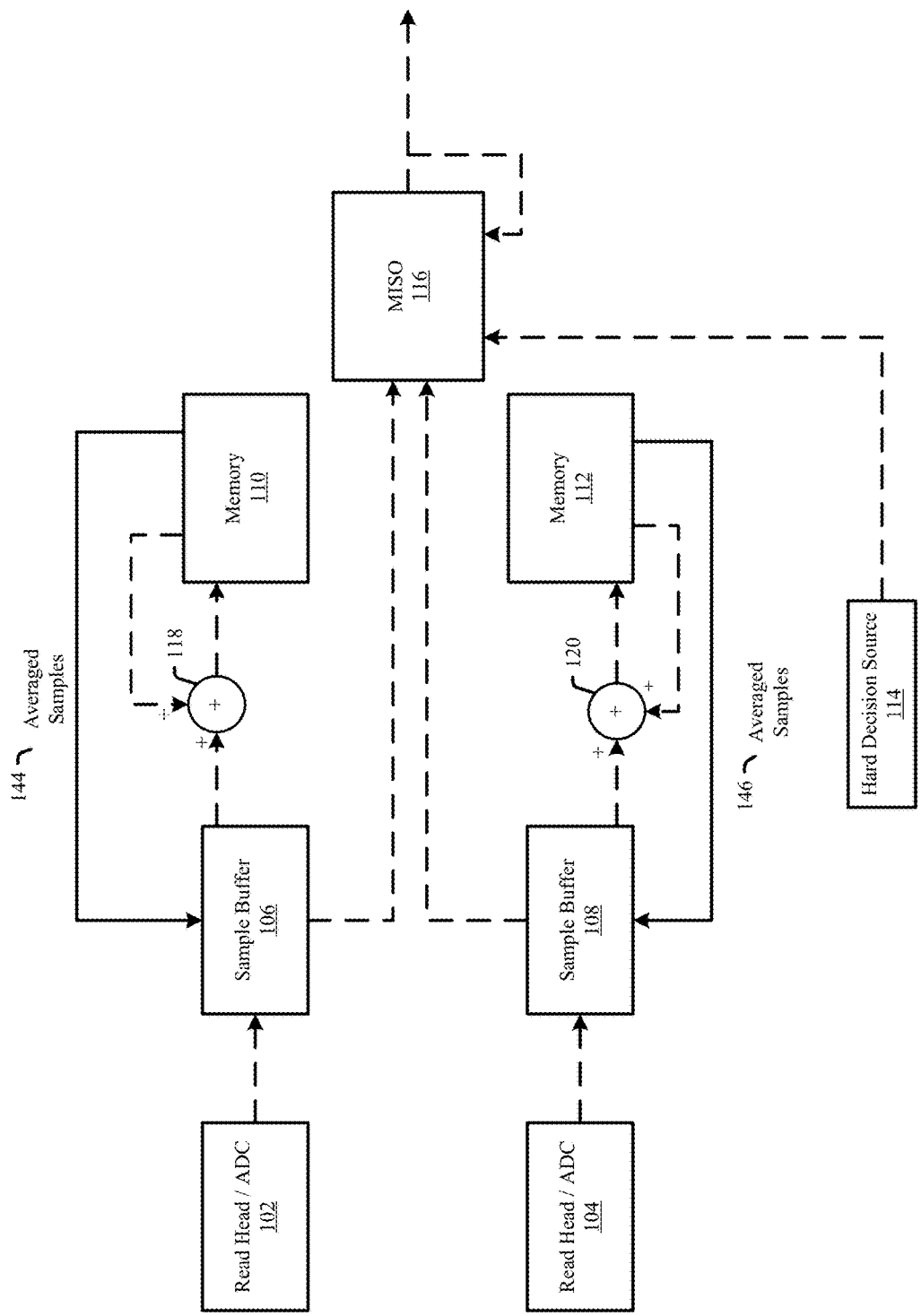

The operations of system 100 illustrated in FIG. 1C may be characterized as the beginning of a replay phase. In particular, in the illustrated example, the memories 110 and 112 may output averaged samples 144 and 146 to the sample buffers 106 and 108, respectively. In some embodiments, the average samples 144 and 146 may be the mean values of the accumulated samples associated with read heads 102 and 104, respectively. As one of ordinary skill in the art would understand in view of this disclosure, the accumulated sample values may be converted from a sum to a mean value using various techniques and at various phases. For example, the adders 118 and 120 may divide the current samples 130 and 138 by N/R before the summation operation is performed. In other examples, the memories 110 and 112 may include a divider circuit that may divide the final values of the updated accumulated samples 132 and 140 by N/R to generate the averaged samples 144 and 146. In addition, in some implementations, the combining of the samples to generate samples 144 and 146 may be performed using a recursive process similar to that described below (e.g. using a spectrally weighted filter process such as using a MISO). Subsequently, the system 100 may progress to the next phase of operations illustrated in FIG. 1D.

Figure 1D:
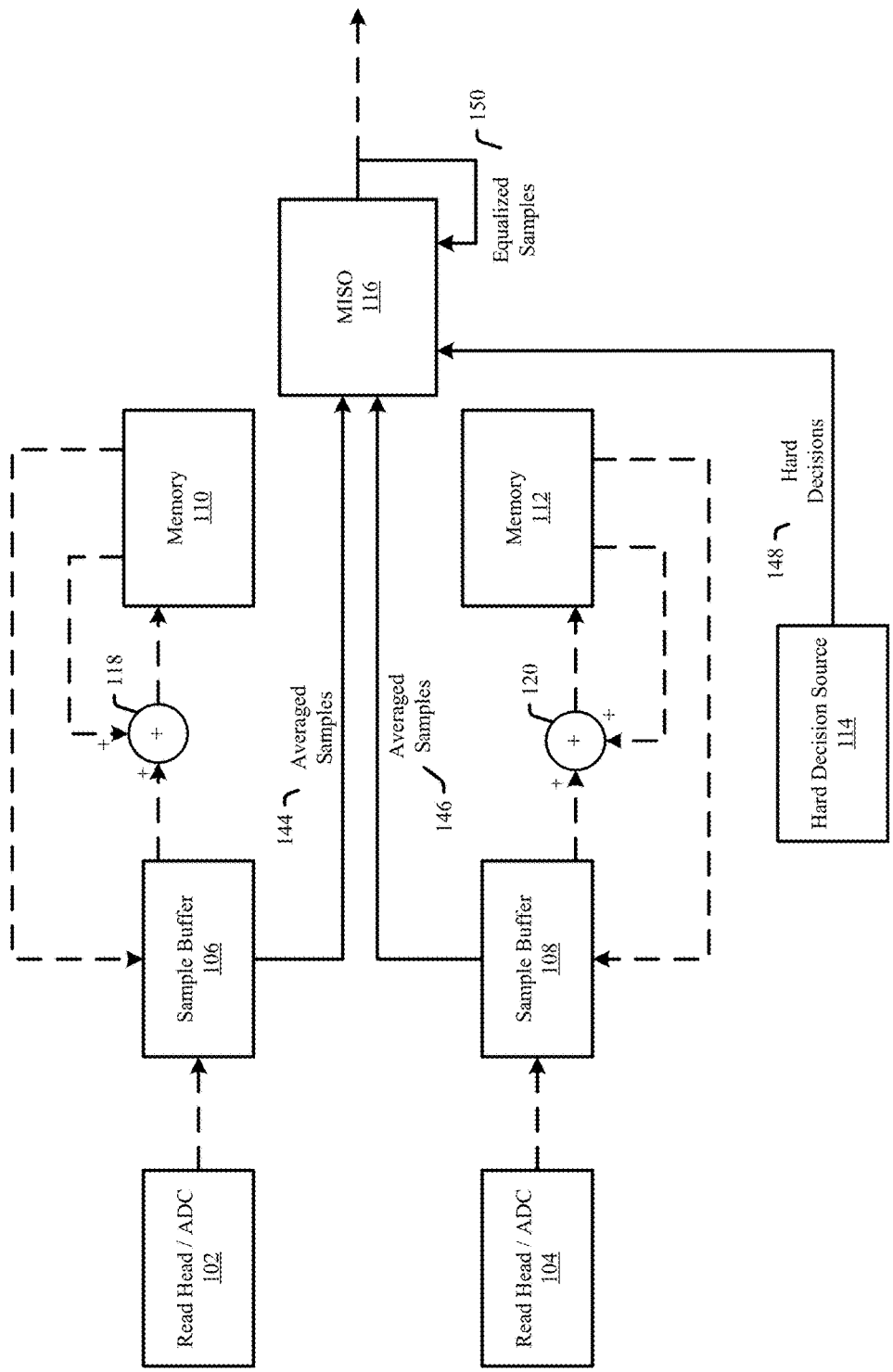

The operations of the system 100 illustrated in FIG. 1D may be performed to train the MISO equalizer 116. For example, the MISO equalizer 116 may be adapted using a least mean squares (LMS) algorithm. The LMS algorithm may be used to adapt to a minimum-mean-squared error criterion. However, implementations are not limited to using LMS and may instead include a variety of other adaptive algorithms, such as 'zero-forcing' equalization, that may adapt parameters to 'other' optimality criteria.

The MISO equalizer 116 can be a filter. In general, MISO equalizers may combine input signals to produce a single output signal which may be provided to a processor, channel, buffer, other circuit, or any combination thereof. For example, a MISO equalizer may be an N input (e.g. where N may be a number of read heads) or N+1 input (e.g. where N+1 may be a number of read heads plus one input for the previous MISO output of the failed sector) adaptive equalizer with N or N+1 L tap finite impulse response filters. In some examples, a weighting factor (e.g. a spectral weighting) may be applied to different inputs. As mentioned above, the equalization operations of the MISO filter circuit 116 can be based on algorithms, such as least mean squares (LMS) algorithms, and recursive least-squares (RLS) algorithms. For example, the equalizer may adapt using LMS or other adaptive algorithms to minimize the mean squared error, bit error rate or other adaptive criteria. However, implementations are not so limited. As mentioned above, in other implementations, the MISO equalizer may perform a simple or weighted average.

In the illustrated example of FIG. 1D, the MISO equalizer 116 may receive the average samples 144 and 146 from the sample buffers 106 and 108, hard decisions 148 from the hard decision source 114, and the current equalized samples 150 as feedback from the output of the MISO equalizer 116. As mentioned above, the received inputs may be utilized to train or retrain the MISO equalizer 116, for example using LMS adaptation. For example, the adaptation or training operations illustrated in FIG. 1D may be repeated for M iterations to train the MISO equalizer 116 (e.g. where M may be an integer greater than zero (0)). Of course, as would be apparent to one of ordinary skill in the art in view of this disclosure, other adaptation techniques may be utilized.

Depending on the embodiment, the hard decision source 114 may have different forms. For example, the hard decision source 114 may be a detector or a memory. Generally, the hard decision source 114 may provide target data for use in adapting the MISO equalizer 116. In some examples, the hard decisions 148 may be preliminary hard decisions gathered during the initial read that failed prior to the recovery or generated during an earlier recovery step. In other examples, the hard decision data may be generated by a detector (e.g. based on the ADC samples 128 and 136). Once the MISO equalizer 116 is trained (e.g. after M LMS adaptation iterations), the system may progress to the next phase of operations illustrated in FIG. 1E.

Figure 1E:
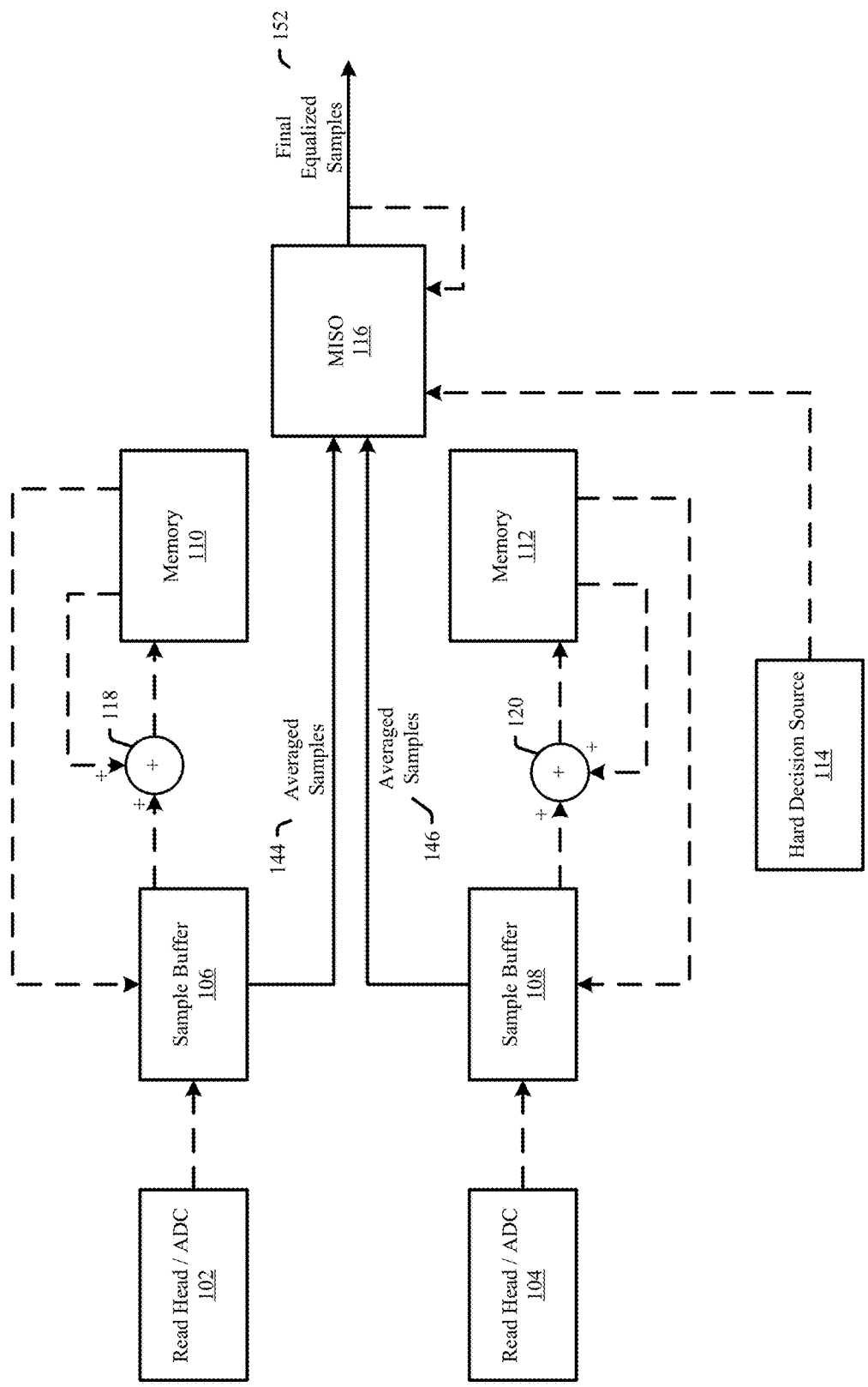

In particular, in FIG. 1E, the trained MISO equalizer 116 may output the final iteration of the equalized samples 152 to a detector/decoder circuit for additional recovery steps. For example, an iterative decoder may utilize the equalized samples 152 to attempt recovery of the failed data segment corresponding to the equalized samples 152.

It should be noted that, although specific types of storage are set forth in the example embodiments illustrated herein, implementations are not so limited. For example, embodiments are not limited to the usage of sample buffers, DRAMs or other specific types of memory.

Figure 2:
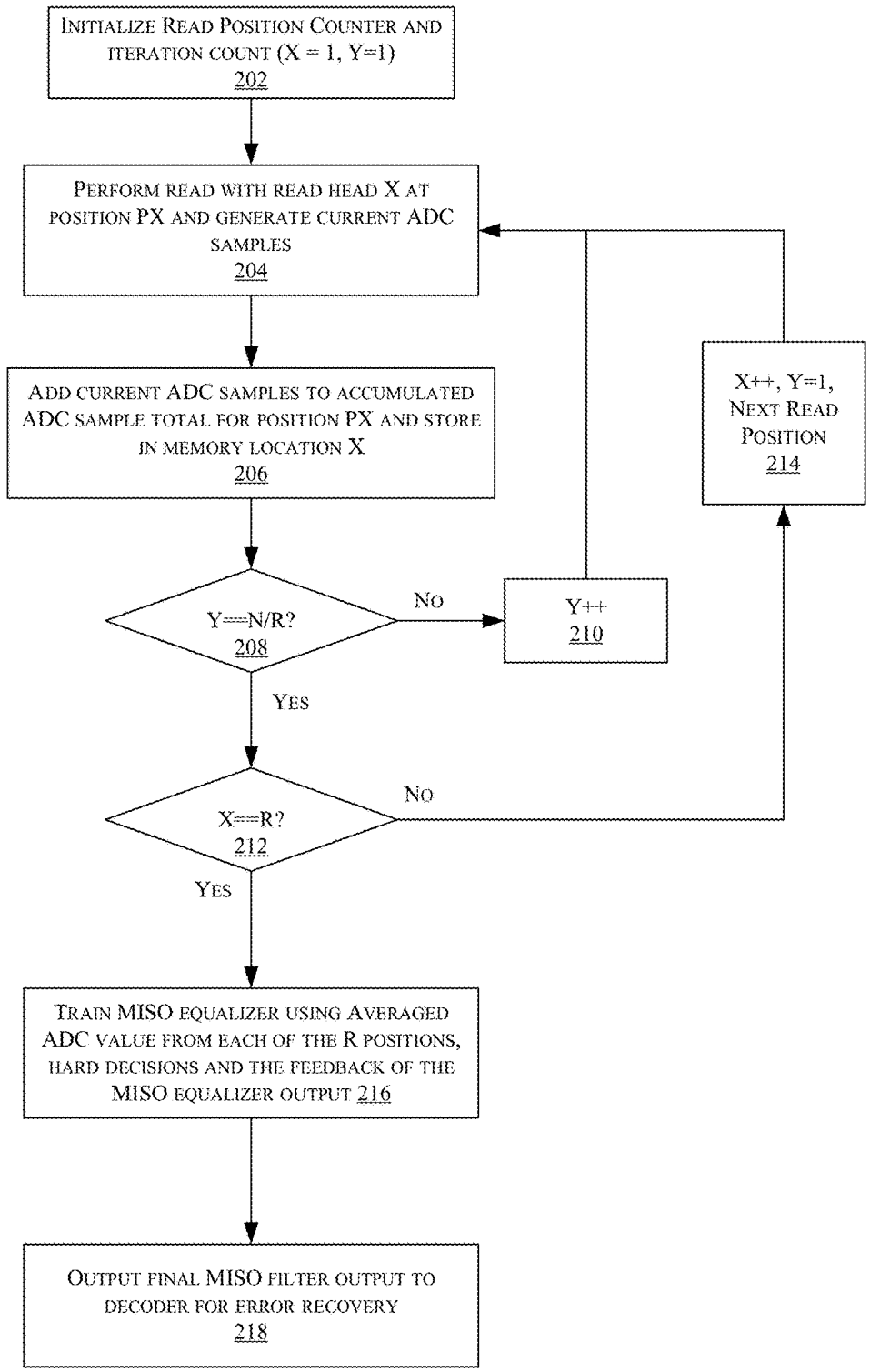
FIG. 2 is a flowchart of a method of error recovery based on samples generated by combining data samples from multiple head positions using a multi-input single-output (MISO) equalizer, in accordance with certain embodiments of the present disclosure.

Referring to FIG. 2, a flowchart of a method of error recovery is shown and is generally designated 200. More particularly, the method 200 can be an embodiment of the system 100 and may perform error recovery based on samples generated by combining data samples from multiple head positions using a multi-input single-output (MISO) equalizer as detailed above with respect to FIGS. 1A-1E.

At 202, a read head array may be moved to an initial position, and a read position count (X) and an iteration count (Y) (e.g. a re-read count for the current position) may each be initialized (e.g. set to one (1)). At 204, a read may be performed by read head X at position PX and current ADC samples may be generated based for the read. The current ADC samples will be added to the accumulated ADC sample total for position PX and stored at a memory location X at 206. When the re-read of the segment or segments is complete, the process may continue to 208.

At 208, the process may determine if the iteration count has reached the N/R (e.g. total number of iterations (N) divided by the number of read positions (R)). If not, the process may continue to 210. If so, the process may continue to 212.

At 210, the iteration count (Y) may be incremented. The process may then continue to 204 for another iteration at position X.

At 212, the process may determine if the read position count has reached R (e.g. total number of read positions). If not, the process may continue to 214. If so, the process may continue to 216.

At 214, the read position count (X) may be incremented, the iteration count (Y) may be reset (e.g. set to 1), and the read head array may be moved to the next read position relative to the storage medium (e.g. relative to a track or data unit). It should be noted that, in some multi-read head examples, the next read position may not require a movement of the read head array if the next read position involves a different read head which is already in the desired read position. The process may then continue to 204 and begin read iterations for the next read position.

At 216, a MISO equalizer may be trained based on the averaged ADC samples from each of the R positions (e.g. the mean value), hard decision data and feedback of the MISO equalizer output (e.g. equalized samples). In some examples, an LMS adaptation technique, such as that illustrated in FIG. 1D, may be repeated for M iterations to train the MISO equalizer 116 (e.g., where M may be an integer greater than zero (0)). The process may then continue to 218.

At 218, the final MISO equalizer output is provided to a detector/decoder. The decoder may continue the error recovery process using the output of the MISO equalizer.

All steps listed for the method 200 may be applied to systems that have error recovery based on ADC samples. Many variations would be apparent in view of this disclosure. For example, instead of performing N/R iterations before moving to a next read position, the system may alternate between the read positions after each re-read. In addition, in such an implementation, the equalizer may process the averages of samples from the read positions after every R re-reads (e.g. after new samples have been collected for each read position). In some multi-read head examples, the different read positions may be "best" or "optimal" positions for the read head sampling data from the storage media. In addition, the number of reads per read position may be different.

Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

Figure 3A:
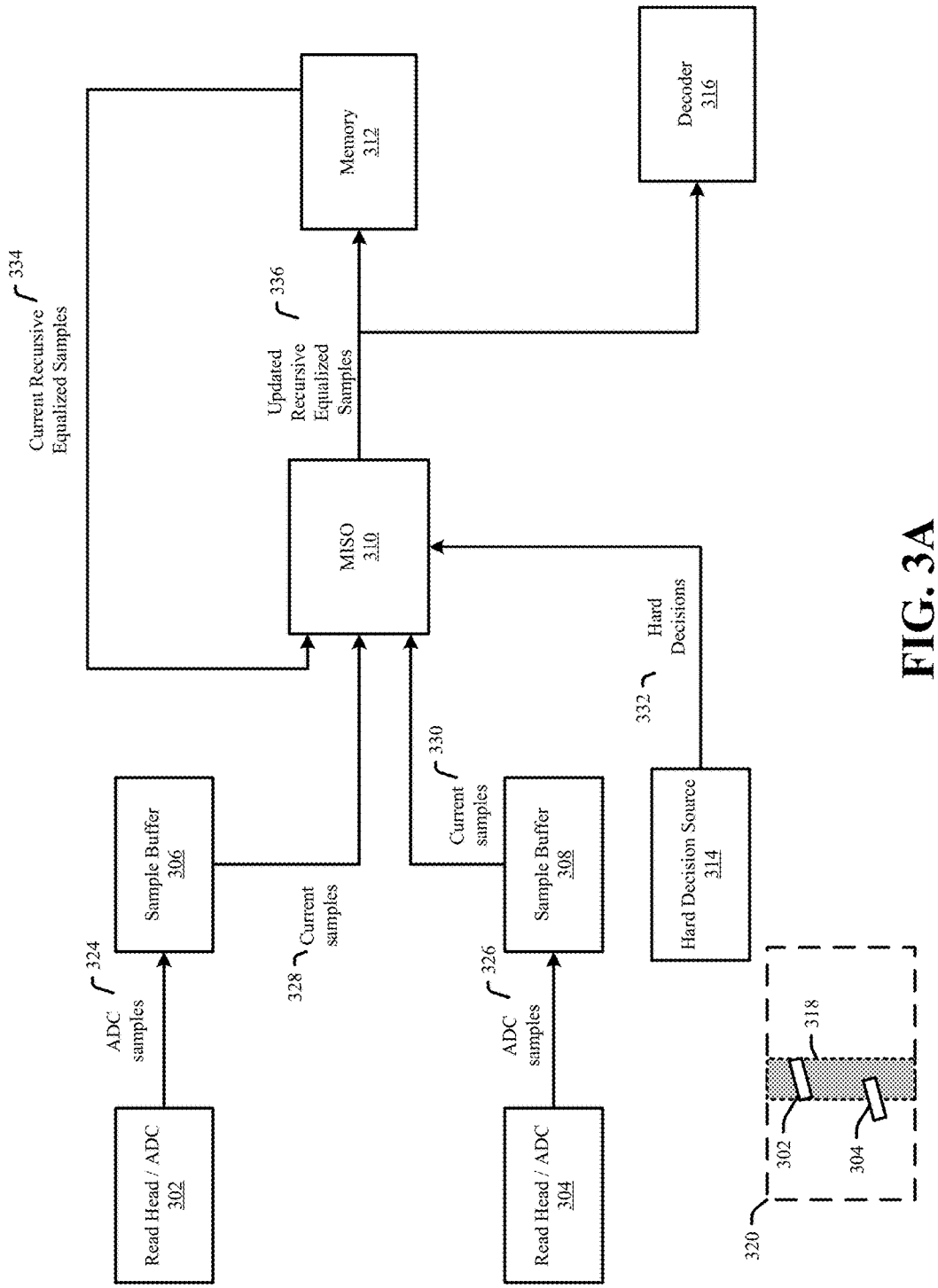
FIG. 3A-3B are block diagrams of a system of error recovery based on samples generated by combining data samples from multiple head positions using a multi-input single-output (MISO) equalizer and recursive combining, in accordance with certain embodiments of the present disclosure.
Figure 3B:
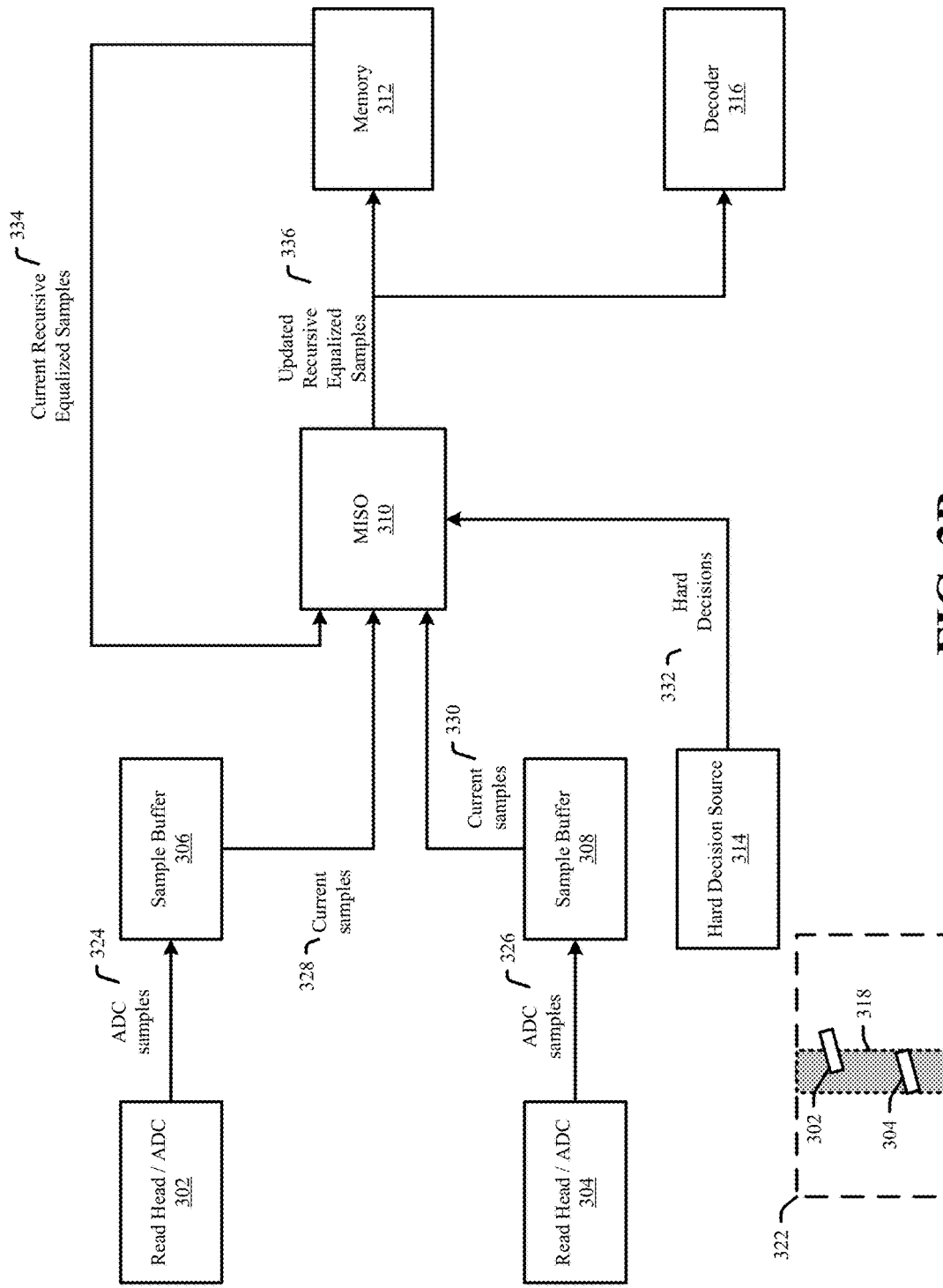

Referring to FIGS. 3A-3B, a block diagram of a system of error recovery is shown and is generally designated 300. More particularly, system 300 may perform error recovery based on samples generated by combining data samples from multiple head positions using a multi-input single-output (MISO) equalizer and recursive combining. Except as otherwise specified below, the various components of system 300 may be the same or similar to the corresponding elements of FIGS. 1A-1E. FIGS. 3A and 3B illustrate the system 300 at different read positions.

System 300 can include a read head and analog-to-digital converter (ADC) subsystem 302 (also referred to herein as read head 302) that may be coupled to a sample buffer 306 and an ADC subsystem 304 (also referred to herein as read head 304) that may be coupled to a sample buffer 308. The sample buffers 306 and 308 may be coupled to respective inputs of a MISO equalizer 310. The MISO equalizer 310 may be coupled to a memory 312, a hard decision source 314 and a decoder 316.

Each of the subsystems 302 and 304, the samples buffers 306 and 308, MISO equalizer 310, memory 312, and the hard decision source 314 may be a separate circuit, a system on chip (SOC), firmware, a processor(s), or other system not listed, or any combination thereof.

In operation, the read head array including read heads 302 and 304 may be positioned relative to a track 318 (e.g. a track of a magnetic recording medium) as shown at 320. In particular, read head 302 may be positioned at a first read head position (e.g. at a first offset from a center of a track) and read head 304 may be positioned at a second read head position (e.g. at a second offset from a center of a track which may be larger or smaller than the first offset). The read head and ADC subsystem 302 may generate ADC samples 324 for the current read (e.g. samples for one or more failed segments). For example, read head 302 may generate an analog signal based on fluctuations in a magnetic field corresponding to the surface of a magnetic storage medium. An ADC of subsystem 302 may convert the analog signal generated by the read head into the digital ADC samples 324. In a similar manner, the read head and ADC subsystem 304 may generate ADC samples 326 for the current read (e.g. samples for one or more failed segments). The ADC samples 324 and 326 may be output to the sample buffers 306 and 308, respectively. In some embodiments, the generation of the ADC samples 324 and 326 may be substantially concurrent.

The sample buffers 306 and 308 may receive and store the ADC samples 324 and 326. For each read, the sample buffers 306 and 308 may output the current samples 328 and 330, respectively, to corresponding inputs of the MISO equalizer 310.

The MISO equalizer 310 may receive the current samples 328 and 330 from the sample buffers 306 and 308, hard decisions 332 from the hard decision source 314, and the recursive equalized samples 334 from previous read stored in memory 312. The MISO equalizer 310 may equalize and combine the current samples 328 and 330 and the current recursive equalized samples 334 to generate updated recursive equalized samples 336. For example, the MISO equalizer 310 may be a spectrally weighted filter which may contain various weights at different taps. However, implementations are not so limited. In other implementations, the MISO equalizer may perform a simple or weighted average. As mentioned above, the MISO equalizer 310 may be an adaptive equalizer, for example using LMS adaptation, and may perform adaptation using the received inputs. For example, the adaptation or training operations illustrated in FIG. 3A may be repeated for each read. As will be discussed in more detail below, the training may continue, for example, until the decoder 316 reports successful decoding of the one or more failed segments. Of course, as would be apparent to one of ordinary skill in the art in view of this disclosure, other adaptation techniques may be utilized.

Depending on the embodiment, the hard decision source 314 may have different forms. Generally, the hard decision source 314 may provide target data for use in adapting the MISO equalizer 310. In some examples, the hard decisions 332 may be hard decisions gathered during a previous read or hard decision data generated by a detector (not shown) based on the ADC samples 328 and 330. For example, the hard decisions may be generated by an equalizer and loop detector of an on the fly recovery system which failed to recover the segment on the fly (e.g. using ADC samples of the read head positioned optimally or closest to the center of the track 318).

The MISO equalizer 310 may output the updated recursive equalized samples 336 to the memory 312 and the decoder 316. In turn, the memory 312 may receive and store the updated recursive equalized samples 336. In some examples, additional processing may be performed on the stored samples 336 before the stored samples are output as current recursive equalized samples 334. Further, the decoder 316 may attempt to decode the failed data based on the samples 336.

In some examples, if the decoder 316 fails to successfully decode the data within N/R reads (e.g. total number of iterations (N) divided by the number of read positions (R)), the process may continue as shown in FIG. 3B.

In particular, after N/R reads, the read head array may be repositioned at a second position. As shown at 322 in FIG. 3B, as a result of the repositioning of the read head array, read head 302 may be positioned at a third read head position and read head 304 may be positioned at a fourth read head position. The process described with regard to FIG. 3A may then be repeated for the second read position. As such, subsequent to the shifting of the read head array to the second read position, the ADC samples 324 and 326 will be based on the new read head positions.

Figure 4:
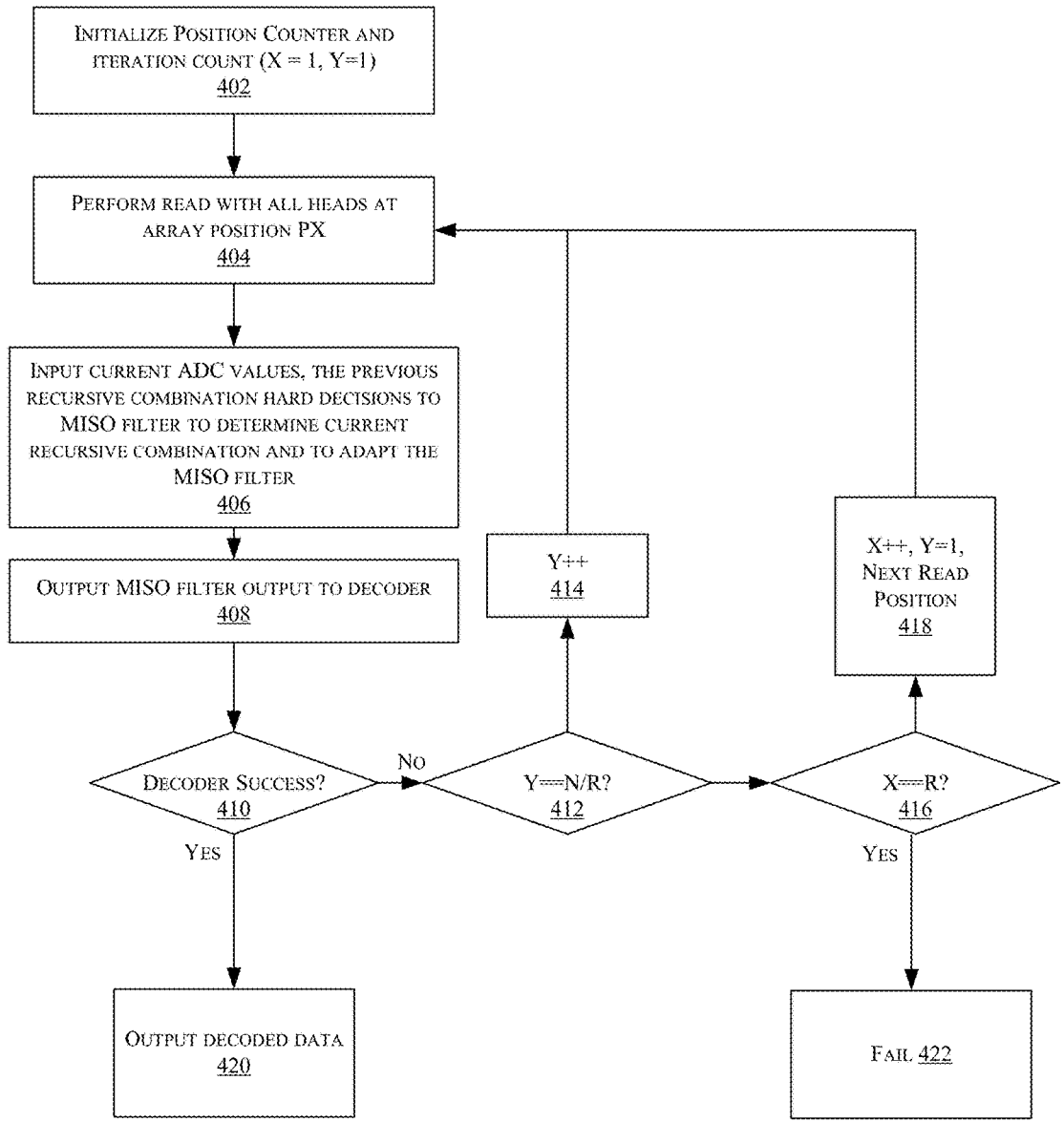
FIG. 4 is a flowchart of a method of error recovery based on samples generated by combining data samples from multiple head positions using a multi-input single-output (MISO) equalizer and recursive combining, in accordance with certain embodiments of the present disclosure.

Referring to FIG. 4, a flowchart of a method including error recovery is shown and is generally designated 400. More particularly, the method 400 can be an embodiment of the system 300 and may perform error recovery based on samples generated by combining data samples from multiple head positions using a multi-input single-output (MISO) equalizer and recursive combining as detailed above with respect to FIGS. 3A and 3B.

At 402, a read head array may be moved to an initial read position and a read position count (X) and an iteration count (Y) may each be initialized (e.g. set to one (1)). At 404, reads may be performed by the read heads at read position PX (e.g. substantially at the same time) and current ADC samples may be generated and stored for each head.

At 406, the current ADC values, recursive equalized samples from the previous reads, and hard decision data may be input to a MISO equalizer. The MISO equalizer may determine updated recursive equalized samples and adapt the MISO equalizer as discussed above with regard to FIG. 3A.

At 408, the updated recursive equalized samples may be output by the MISO equalizer to a decoder and stored in a memory. At 410, a determination may be made as to whether the decoder successfully decoded the data corresponding to the updated recursive equalized samples. If so, the process continues to 420. At 420, the process may return the successfully decoded data to the host or other process requesting the data. If the decoder has not yet been successful, the process may continue to 412.

At 412, the process may determine if the iteration count has reached N/R (e.g. total number of iterations (N) divided by the number of read positions (R)). If not, the process may continue to 414. If so, the process may continue to 416.

At 414, the iteration count (Y) may be incremented. The process may then continue to 414 for another iteration at position X.

At 416, the process may determine if the read position count has reached R (e.g. total number of read positions). If so, the process may continue to 422. At 422, the error recovery procedure may attempt a different type of error recovery or the read may end with a failure status. If the read position count has not reached R, the process may continue to 418.

At 418, the read position count (X) may be incremented, the iteration count (Y) may be reset (e.g. set to 1), and the read head array may be moved to the next read position relative to the storage medium (e.g. relative to a track or data unit).

All steps listed for the method 400 may be applied to systems that have error recovery based on ADC samples. Many variations would be apparent in view of this disclosure. For example, embodiments may utilize any number of read heads, read positions and so on. In addition, the number of reads per read position may be different. Moreover, some examples may not perform the generation of the updated accumulated sample value or output the updated accumulated sample value to the decoder for every read. For example, samples from multiple reads may be averaged before being provided to the MISO equalizer. The variations listed above with regard to FIG. 2 may apply to system 300 and method 400. Similarly, the variations noted herein for method 400 may apply to systems 100 and 300 and method 200.

Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

Figure 5:
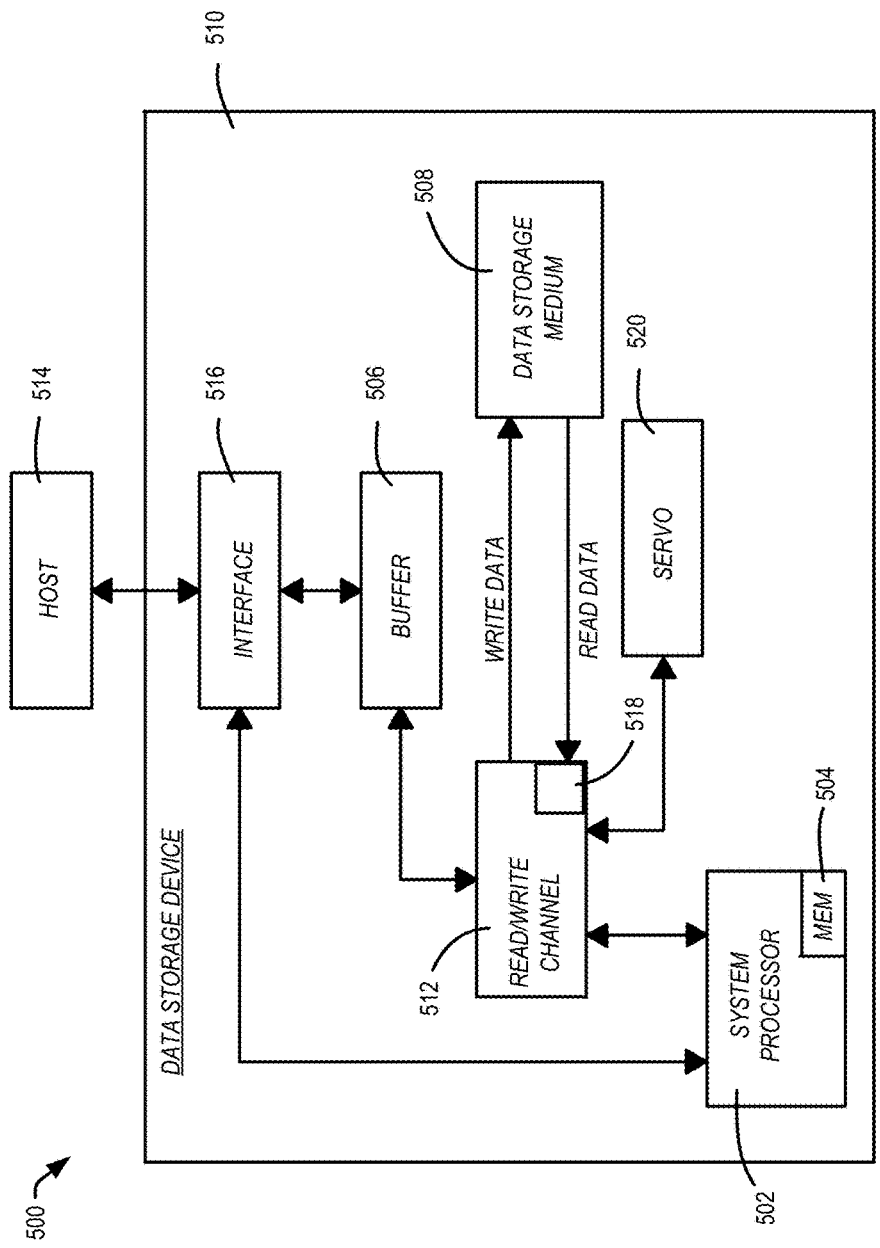
FIG. 5 is a block diagram of a system including target parameter adaptation, in accordance with certain embodiments of the present disclosure.

Referring to FIG. 5, a block diagram of a system including target parameter adaptation is shown and generally designated 500. The system 500 can be an example of a data storage device (DSD), and may be an example implementation of systems and methods 100, 200, 300 or 400. The DSD 510 can optionally connect to and be removable from a host device 514, which can be a device or system having stored data, such as a desktop computer, a laptop computer, a server, a digital video recorder, a photocopier, a telephone, a music player, other electronic devices or systems not listed, or any combination thereof. The data storage device 510 can communicate with the host device 514 via the hardware/firmware based host interface circuit 516 that may include a connector (not shown) that allows the DSD 510 to be physically connected and disconnected from the host 514.

The DSD 510 can include a system processor 502, which may be a programmable controller, and associated memory 504. The system processor 502 may be part of a system on chip (SOC). A buffer 506 may temporarily store data during read and write operations and can include a command queue. The read/write (R/W) channel 512 can encode data during write operations to, and reconstruct data during read operations from, the data storage medium 508. The data storage medium 508 is shown and described as a hard disc drive, but may be other types of magnetic medium, such as a flash medium, optical medium, or other medium, or any combination thereof.

The R/W channel 512 may receive data from more than one data storage medium at a time, and in some embodiments can also receive multiple data signals concurrently, such as from more than one output of a read head. For example, storage systems having two-dimensional magnetic recording (TDMR) systems can have multiple reading or recording elements, and can read from two tracks simultaneously or nearly simultaneously. Multi-dimensional recording (MDR) systems can receive two or more inputs from multiple sources (e.g. recording heads, flash memory, optical memory, and so forth). The R/W channel 512 can combine multiple inputs and provide a single output, as described in examples herein.

The block 518 can implement all of or part of the systems and functionality of systems and methods 100, 200, 300 and 400. In some embodiments, the block 518 may be a separate circuit, integrated into the R/W channel 512, included in a system on chip, firmware, software, or any combination thereof.

The servo 520 may receive instructions from one or more of the R/W channel 512 and the system processor 502 and may control the movement of a servo arm to position a read head array. In some embodiments, the servo 520 may be a separate circuit, integrated into the R/W channel 512, included in a system on chip, firmware, software, or any combination thereof.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture and voltages that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   generating a set of first ADC samples based on a first signal associated with a first read head position and a failed segment;
   generating a set of second ADC samples based on a second signal associated with a second read head position and the failed segment; and
   generating, by a MISO equalizer, a set of equalized ADC samples based on the set of first ADC samples and the set of second ADC samples.

2. The method of claim 1, further comprising: generating an output signal as a plurality of bit values based on the set of equalized ADC samples.

3. The method of claim 1, further comprising:
   performing the generating of the set of first ADC samples based on an analog signal from a first read head; and
   performing the generating of the set of second ADC samples based on an analog signal from a second read head.

4. The method of claim 3, further comprising:
   performing the generating of the set of first ADC samples when the first read head is positioned at a first offset from a center of a track corresponding to the failed segment and the second read head is positioned at a second offset from the center of the track, the first offset being different than the second offset.

5. The method of claim 3, further comprising:
   generating another set of first ADC samples based on the first signal associated with the first read head position and the failed segment;
   generating a set of averaged first ADC samples based on the set of first ADC samples and the other set of first ADC samples;
   generating another set of second ADC samples based on the second signal associated with the second read head position and the failed segment;
   generating a set of averaged second ADC samples based on the set of second ADC samples and the other set of second ADC samples; and
   performing the generating, by the MISO equalizer, of the set of equalized ADC samples based on the set of first averaged ADC samples and the set of second ADC samples using the set of averaged first ADC samples and the set of averaged second ADC samples.

6. The method of claim 5, further comprising:
   adapting the generating, by the MISO equalizer, of the one or more equalized ADC samples using the set of averaged first ADC samples and the set of averaged second ADC samples.

7. The method of claim 1, further comprising:
   performing the generating of the set of first ADC samples based on an analog signal from a first read head;
   performing the generating of the set of second ADC samples based on an analog signal from a second read head; and
   performing the generating of the set of first ADC samples and the generating of the set of second ADC samples when the first read head is positioned at a first offset from a center of a track corresponding to the failed segment and the second read head is positioned at a second offset from the center of the track, the first offset being different than the second offset.

8. The method of claim 1, further comprising:
   performing the generating, by the MISO equalizer, of the set of equalized ADC samples by inputting, to the MISO equalizer, the set of first ADC samples, the set of second ADC samples and another set of equalized ADC samples for the failed segment previously generated by the MISO equalizer.

9. The method of claim 1, further comprising:
   attempting decoding of the one or more equalized ADC samples; and
   halting generating of additional sets of first ADC samples and additional sets of second ADC samples when the attempted decoding is successful.

10. The method of claim 5, further comprising:
    generating hard decision data based on at least one of the set of first ADC samples and the set of second ADC samples; and
    adapting the MISO equalizer using the set of first ADC samples and set of second ADC samples, the hard decision data and another set of equalized ADC samples for the failed segment previously generated by the MISO equalizer.

11. A system comprising:
a magnetic disc storage medium;
a read head array;
one or more ADC circuits configured to:
   generate a plurality of sets of first ADC samples based on a first signal from the read head array associated with a first read head position of the read head array relative to the magnetic storage medium and a failed segment stored on the magnetic disc storage medium; and
   generate a plurality of sets of second ADC samples based on a second signal from the read head array associated with a second read head position of the read head array relative to the magnetic storage medium and the failed segment stored on the magnetic disc storage medium;
one or more accumulator circuits configured to:
   generate averaged first ADC samples based on the plurality of sets of first ADC samples; and
   generate averaged second ADC samples based on the plurality of sets of second ADC samples; and
a MISO equalizer configured to:
   generate one or more equalized ADC samples based on the averaged first ADC samples and the averaged second ADC samples.

12. The system of claim 11 further comprising:
a decoder circuit configured to generate an output signal as a plurality of bit values based on the equalized ADC samples.

13. The system of claim 11 further comprising:
a circuit configured to move the read head array relative to the magnetic storage medium subsequent to the generation of the plurality of sets of first ADC samples and prior to the generation of the plurality of sets of second ADC samples.

14. The system of claim 13 further comprising the one or more ADC circuits configured to:
perform the generation of the plurality of sets of first ADC samples based on an analog signal from a first read head of the read head array when the first read head is positioned at a first offset from a center of a track corresponding to the failed segment and the second read head of the read head array is positioned at a second offset from the center of the track, the first offset being different than the second offset; and
perform the generation of the plurality of sets of second ADC samples based on an analog signal from a second read head when the second read head is positioned at a third offset from the center of the track corresponding to the failed segment and the first read head is positioned at a fourth offset from the center of the track, the third offset being different than the fourth offset.

15. The system of claim 11 further comprising:
a first read head of the read head array configured to generate the first signal; and
a second read head of the read head array configured to generate the second signal.

16. A system comprising:
a magnetic disc storage medium;
a read head array;
a circuit configured to move the read head array relative to the magnetic disc storage medium;
one or more ADC circuits configured to:
   generate a set of first ADC samples based on a first signal from the read head array associated with a first read head position of the read head array relative to the magnetic storage medium and a failed segment stored on the magnetic storage medium; and
   generate a set of second ADC samples based on a second signal from the read head array associated with a second read head position of the read head array relative to the magnetic storage medium and the failed segment; and
a MISO equalizer configured to:
   generate a set of equalized ADC samples based on the set of first ADC samples and the set of second ADC samples.

17. The system of claim 16 further comprising:
the one or more ADC circuits further configured to:
   generate another set of first ADC samples based on the first signal associated with the first read head position and the failed segment; and
   generate another set of second ADC samples based on the second signal associated with the second read head position and the failed segment; and
the MISO equalizer further configured to:
   generate another set of equalized ADC samples based on:
      the other set of first ADC samples;
      the other set of second ADC samples; and
      the set of equalized ADC samples.

18. The system of claim 17 further comprising:
the one or more ADC circuits further configured to:
   generate another set of first ADC samples based on the first signal associated with a third read head position and the failed segment; and
   generate another set of second ADC samples based on the second signal associated with the fourth read head position and the failed segment; and
the circuit configured to move the read head array being configured to move the read head array subsequent to the generation of the set of first ADC samples and the set of second ADC samples and prior to the generation of the other set of first ADC samples and the other set of second ADC samples.

19. The system of claim 18 further comprising:
the first read head position having a first offset from a center of a track corresponding to the failed segment;
the second read position having a second offset from the center of the track, the first offset being different than the second offset; and
the third read head position having a third offset from the center of the track corresponding to the failed segment; and
the fourth read position having a fourth offset from the center of the track, the fourth offset being different than the third offset.

20. The system of claim 16 further comprising
a detector circuit configured to generate hard decision data based on at least one of the set of first ADC samples and the set of second ADC samples; and
the MISO equalizer further configured to adapt the generation of the one or more equalized ADC samples using the set of first ADC samples, the set of second ADC samples, the hard decision data and the one or more equalized ADC samples.

* * * * *